United States Patent [19]

Masuoka et al.

[11] Patent Number: 5,116,611
[45] Date of Patent: May 26, 1992

[54] ANTIFOULING PAINT

[75] Inventors: Shigeru Masuoka, Hyogo; Yoshihiro Honda, Osaka, both of Japan

[73] Assignee: Nippon Oil and Fats Co., Ltd., Tokyo, Japan

[21] Appl. No.: 519,349

[22] Filed: May 2, 1990

Related U.S. Application Data

[63] Continuation of Ser. No. 212,745, Jun. 28, 1988, abandoned.

[30] Foreign Application Priority Data

Jun. 28, 1987 [JP] Japan .................. 62-160090
Nov. 4, 1987 [JP] Japan .................. 62-278473

[51] Int. Cl.$^5$ .............. C08L 31/00; C08L 31/02; C09D 5/14
[52] U.S. Cl. .................. 424/78.09; 514/63; 523/122; 526/219; 528/32
[58] Field of Search .............. 526/279; 528/32; 424/78, 81; 514/63; 523/122

[56] References Cited

U.S. PATENT DOCUMENTS 4,593,055  6/1986  Gitlitz et al. .............. 523/122
4,670,481  6/1987  Foscante et al. .............. 523/122

FOREIGN PATENT DOCUMENTS 050249    4/1982  European Pat. Off. .
152094    7/1985  Japan .
62-013471 1/1987  Japan .
62-13971  1/1987  Japan .
8402915   8/1984  PCT Int'l Appl. .

Primary Examiner—Lester L. Lee
Attorney, Agent, or Firm—Sughrue, Mion, Zinn, Macpeak & Seas

[57] ABSTRACT

This invention is directed to an antifouling paint that contains a polymer having organosilyl groups and/or organosiloxane groups in side claims.

5 Claims, No Drawings

ANTIFOULING PAINT

This is a continuation of application Ser. No. 07/212,745 filed Jun. 28, 1988 and now abandoned.

FIELD OF THE INVENTION

The present invention relates to an antifouling paint that contains a polymer having organosilyl groups and/or organosiloxane groups in side chains.

BACKGROUND OF THE INVENTION

Ship bottoms, buoys, fishing nets (e.g., nets for cultivating young yellowtail, scallops, etc., and stationary nets for catching salmon), and other structures submerged in seawater such as marine antifouling sheets and cooling water intake or discharge pipes are fouled with organisms such as barnacles, tube worms and algae that attach to the surfaces of these structures and cause various troubles. It is routine practice to prevent the attachment of these marine fouling organisms by coating the surfaces of the aforementioned items with antifouling paints. Antifouling paints are roughly divided into the following two-classes.

(A) An antifouling paint that employs antifoulants such as organotin copolymers and cuprous oxide that are capable of preventing the attachment of fouling organisms and have low solubility in seawater. Paints that employ organotin compounds as antifoulants are shown in JP-B-40-21426, 44-9579, 46-13392, 49-20491, 51-11647 and 52-48170 (the term "JP-B" as used herein means an "examined Japanese Publication").

(B) An antifouling paint that does not employ any antifoulants and which will not dissolve in seawater; instead, it uses silicone rubbers that cure by the action of a catalyst or moisture to form a crosslinked film. For instance, an antifouling paint that uses a curable silicone rubber as a coating agent is shown in JP-B-53-35974. An antifouling paint that uses a mixture of a silicone oil and an oligomer-like silicone rubber having a terminal hydroxyl group is shown in JP-A-51-96830 (the term "JP-A" as used herein means an "unexamined Japanese published patent application"). A mixture of a curable silicone rubber and a flowable organic compound that does not contain a metal or silicon is shown in JP-A-53-79980. A paint that serves to prevent the attachment of fouling marine organisms is also shown in JP-B-60-3433 and this paint is composed of a mixture of an oligomer-like low temperature curing silicone rubber (such as those available from Shin-Etsu Chemical Co., Ltd. under the trade names of "KE 45 TS" and "KE 44 RTV") and liquid paraffin or petrolatum.

These known antifouling paints exhibit characteristic performance depending upon their type and have been used in applications that suit specific object. However, these paints have the following problems to be solved.

The antifouling paints of class (A) are further divided into two subclasses. In one subclass of such antifouling paints, the film-forming resin does not dissolve in seawater and only the antifoulant dissolves in seawater to prevent the attachment of marine organisms. The paint films formed from this class of antifouling paints exhibit the intended effect during the initial period of application but after the antifoulant on the surface of the film is lost as a result of its dissolution in seawater, the antifoulant in the interior of the film will gradually dissolve. However, the dissolution rate of the antifoulant decreases as the depth of the area of the paint film in which the antifoulant is present increases, and the antifouling effect of the film will diminish with time.

In the second subclass of antifouling paints of class (A), both the antifoulant and the film forming resin dissolve in seawater. The antifouling effect is achieved solely by the antifoulant or by a combination of the antifoulant and the resin component (e.g., an organotin copolymer) and in either case, the surface of the paint film dissolves in seawater, continuously providing the antifouling paint film with an active surface. Therefore, the film formed from this type of antifouling paints is capable of maintaining the desired antifouling effect over a longer period than the aforementioned first subclass of paints (A). However, the effect of this type of antifouling paints is not completely satisfactory because the paint film they form is consumed fairly rapidly.

Antifouling paints of class (B) are designed to prevent the attachment of marine organisms by making use of the slipping property (low surface energy) of the silicone rubber coating. These antifouling paints have the advantage that they do not contain any component that will dissolve in seawater to cause its pollution as do antifouling paints of class (A). However, the mechanism of film formation from these paints involves the crosslinking of silicone rubbers after paint application and presents the following problems.

The first problem is associated with the curing of the film of the applied paint. For instance, when an antifouling paint of the type described in JP-B-60-3433 that employs a low temperature curing oligomer-like silicone rubber that cures by the action of moisture in air to form a paint film is applied to a substrate, the crosslinking agent incorporated to control the curing condensation reaction of the silicone rubber is activated by atmospheric moisture or temperature to cause premature curing of the surface of the paint film. This retards the curing of the interior portion of the paint film to produce an insufficiently cured film which is most likely to blister or separate from the substrate. Furthermore, the slow penetration of moisture into the bulk of the film prolongs the time required to achieve its complete curing.

If the antifouling paint of the type described above is applied in a hot and humid atmosphere, the hydrolysis of the crosslinking agent predominates over the crosslinking reaction and the resulting paint film does not have a sufficient crosslinking density required to provide satisfactory properties.

In a dry climate, the amount of aerial moisture is too small to cause hydrolysis of the crosslinking agent and the applied paint will cure very slowly. In order to avoid this problem, catalysts such as tin compounds and platinum are sometimes used as curing accelerators but their effectiveness is limited in cold climates.

The second problem concerns topcoating. In the usual case, the solvent in a paint for topcoating slightly softens the surface of the undercoat to ensure good intercoat bonding. However, in the application of the antifouling paint under consideration, the silicone rubber in the first applied coating cures to such an extent that the solvent in a paint for topcoating is not capable of softening the surface of the silicone rubber to provide satisfactory intercoat adhesion.

The third problem is related to pot life. In practice, the length of coating operations may be extended beyond the scheduled period of time if the item to be treated is large in size or has a complex structure. In addition, the operation may be interrupted by unexpected rainfall or increase in the humidity of the air. In these cases, the paint which has been stirred in an open container must be left to stand until the surface of the substrate becomes sufficiently dry to warrant continued application of paint. In view of these possibilities, antifouling paints having short pot lives present great inconvenience in coating operations.

The fourth problem is associated with storage stability. Antifouling paints, after having been prepared, are stored until use and the duration of such storage sometimes extends for a long period. Therefore, the manufacture of paints that will cure by the action of moisture necessitates the filling of their containers with a dry nitrogen gas. In addition, once the container is opened, atmospheric moisture will get in to cause curing of the surface of the paint or an increase in its viscosity. Paint that has undergone such changes is no longer suitable for use.

SUMMARY OF THE INVENTION

The present inventors conducted intensive studies in order to solve the aforementioned problems of prior art antifouling paint systems. As a result, the present inventors have succeeded in preparing an antifouling paint that employs an antifoulant in combination with a certain polymer that dries upon solvent evaporation and which is free from all of the defects of the known antifouling paints of class (B) which employ a silicone rubber either alone or in combination with a silicone oil or paraffin. The polymer produces a coating that exhibits better antifouling effects than paints of class (B). In addition, this polymer is anticipated to display even better antifouling effects than known antifouling paints of class (A) which employ organotin copolymers as antifoulants.

The present invention generally relates to an antifouling paint containing as its essential components an antifoulant and a polymer of at least one of the monomers A, A' and A" represented by the following general formulas (a), (b) and (c), respectively, and/or a copolymer composed of at least one of the monomers A, A' and A" and one or more vinyl polymerizable monomers B that are copolymerizable with said monomers A, A' and A":

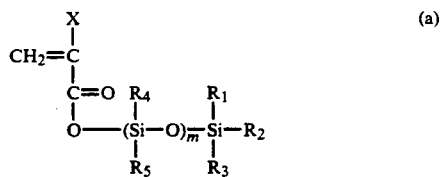

(a)

where X is a hydrogen atom or a methyl group; m is a real number of 1 or more; $R_1$-$R_5$ each is a group selected from the group consisting of an alkyl group, an alkoxyl group, a phenyl group, a substituted phenyl group, a phenoxyl group and a substituted phenoxyl group, in which $R_1$-$R_5$ may be the same or different;

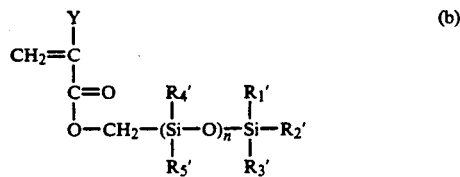

(b)

where Y is a hydrogen atom or a methyl group; n is 0 or more; $R'_1$-$R'_5$ each is a group selected from the group consisting of an alkyl group, an alkoxyl group, a phenyl group, a substituted phenyl group, a phenoxyl group and a substituted phenoxyl group, in which $R'_1$-$R'_5$ may be the same or different; and

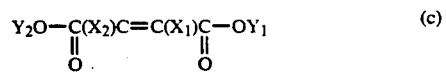

(c)

where $X_1$ and $X_2$ each is a hydrogen atom or a methyl group which may be either cis or trans form; one of $Y_1$ and $Y_2$ is an organic group represented by the following general formula (1):

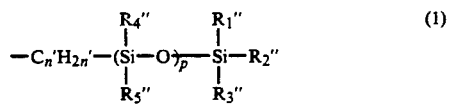

(1)

where n' is an integer of 0 or 1; p is 0 or more; $R''_1$-$R''_5$, which may be the same or different, each is a group selected from the group consisting of an alkyl group, an alkoxyl group, a phenyl group, a substituted phenyl group, a phenoxyl group, a substituted phenoxyl group and an organosiloxane group, with the other being a hydrogen atom, an alkyl group, a phenyl group, a substituted phenyl group or an organic group represented by formula (1).

Prior to the accomplishment of the present invention, the present inventors proposed in Japanese Patent Application No. 61-311221 an antifouling paint that contains as the essential ingredients an antifoulant and a polymer or copolymer using a monomer (in particular, one having a trimethylsilyl group or a polydimethylsiloxane group) in which the methylene group (—$CH_2$—) in formula (b) as interposed between an Si atom and the ester-forming portion is replaced by a $C_2$-$C_4$ alkylene group. In this prior application, the number of carbon atoms in the alkylene group in the monomer was limited to not smaller than 2 on the basis of the following understanding: if n is less than 2, the linkage at the ester-forming portion of the monomer becomes weak and during polymerization or during the use of the resulting paint, the ester linkage dissociates to either reduce the antifouling effect of the paint film or shorten the duration of time during which it exhibits the intended antifouling effect.

However, the subsequent studies of the present inventors showed that even when the alkylene group under discussion had less than 2 carbon atoms (i.e. it was a methylene group having only one carbon atom) and even when no such alkylene group was interposed between a Si atom and the ester-forming portion, a desired polymer could be produced without any dissociation of the ester-forming portion by adopting some means such as performing polymerization with all water content being eliminated from the solvent and monomers. The present inventors also have found that the coating formed from this polymer exhibited a self-polishing property in seawater by undergoing hydrolysis from the surface. To explain the mechanism of this self-polishing effect more specifically, the coating starts to be hydrolyzed slowly from its surface to cause dissolution of the resin into seawater as accompanied by simultaneous release of the antifouling chemical dispersed in the resin. Paints of this type are already known and an example is the trialkylsilyl acrylate based polymer described in U.S. Pat. Nos. 4,594,365 and 4,593,055 to M&T. However, this polymer hydrolyzes too fast to be usable in practical applications. As a result of intensive studies conducted to solve this problem, the present inventors have succeeded in developing an antifouling paint that hydrolyzes slowly to exhibit its effect over a prolonged period of time.

DETAILED DESCRIPTION OF THE INVENTION

The antifouling paint of the present invention contains as one of its essential components a homopolymer of one or more of the monomers A, A' and A" represented by the above-noted general formulas (a), (b) and (c), respectively, or a copolymer of two or more of such monomers A, A' and A" (the homopolymer and copolymer are hereinafter collectively referred to as polymer A), or a copolymer which is composed of one or more of the monomers A, A', and A" and one or more vinyl polymerizable monomers B that are copolymerizable with said monomers A, A' and A" (said copolymer is hereinafter designated as copolymer AB). Polymer A may be used in combination with copolymer AB as required.

Each of the polymer A and copolymer AB contains in side chains an organosilyl or organosiloxane group derived from monomers A, A' and A", so a paint film containing this polymer A and/or copolymer AB in combination with an antifoulant is capable of preventing the attachment of marine organisms to the surfaces of structures in seawater in an effective and lasting manner by slowly releasing the antifoulant into seawater at the same time of the hydrolysis of the organosilyl or organosiloxane group. The present inventors have found as will be shown in the Examples described hereinbelow that the attachment preventing effect can be remarkably exhibited than by conventional antifouling paints..

Both polymer A and copolymer AB are easily soluble in organic solvents, so if a paint containing one or both of them in combination with an antifoulant is dissolved in a solvent and applied to the surface of an item to be submerged in seawater, a uniform paint film can be readily formed by simply drying the applied paint. Furthermore, unlike silicone rubbers which cure upon chemical reactions after application, polymer A and copolymer AB are essentially non-reactive and the film formed of the paint containing them is insensitive to both aerial moisture and temperature. In addition, a solution of this paint in a solvent has an extended pot life and better storage stability. In case of overcoating this film with a film of the same or different type, the surface of undercoat is resolved by the solvent used in the topcoat, thereby resulting in an excellent intercoat bonding. In other words, all of the problems associated with the conventional antifouling paint systems can be solved by employing polymer A and/or copolymer AB.

Monomers A, A' and A" used in the present invention for preparing polymer A or copolymer AB which affords the advantages described above are each an unsaturated ester having an organosilyl or organosiloxane group in their molecule as represented by their formulas (a), (b) and (1).

In general formulas (a), (b) and (1), m, n, and p each represents the number of recurrrences of the organosiloxane group. While m is a real number of 1 or more and n and p each is 0 or more, it is usually preferred that they are up to about 5,000. Since the organosiloxane group is derived from dehydrating condensation or like means, monomers A, A' and A" is generally a mixture of compounds having different numbers of the recurrence of the organosiloxane group. Therefore, the values of m, n and p should be expressed in terms of their average ($\overline{m}$, $\overline{n}$, p) and this is why each of m, n, and p is defined as a real number in formulas (a), (b) and (1), repspectively. From this viewpoint, the values of m, n, p in the monomers listed in the Examples to be described later in this specification are expressed as $\overline{m}$, $\overline{n}$, and p.

$R_1$-$R_5$ in formula (a), and $R'_1$-$R'_5$, in formula (b) and $R''_1$-$R''_5$ in formula (1) each is a group selected from the group consisting of an alkyl group, an alkoxyl group, a phenyl group, a substituted phenyl group, a phenoxyl group and a substituted phenoxyl group. It is generally preferred that each of the alkyl and alkoxyl groups has up to about 5 carbon atoms. Illustrative substituents for the substituted phenyl and phenoxyl groups include a halogen, an alkyl group having up to about 5 carbon atoms, an alkoxyl group and an acyl group. $R_1 \propto R_5$, $R'_1$-$R_5$, and $R''_1$-$R''_5$ may be the same or different, respectively.

Monomers A, A' and A" are synthesized, for example, by dehydrocondensation of acrylic acid, methacrylic acid or a maleic acid monoester with an organo silyl compound having $R_1$-$R_3$, $R'_1$-$R'_3$, or $R''_1$-$R''_3$ in its molecule or an organosiloxane compound having $R_1$-$R_5$, $R'_1$-$R'_5$, or $R''_1$-$R''_5$ in its molecule, such as an organosiloxane having a di-substituted monohydroxysilane group at one terminal, a tri-substituted monohydroxysilane, an organosiloxane having a hydroxymethyl group at one terminal, or a tri-substituted silane.

Monomer A, A' or A" may be copolymerized with a vinyl polymerizable monomer B to form copolymer AB, and illustrative compounds that can be used as monomer B include: methacrylate esters such as methyl methacrylate, ethyl methacrylate, butyl methacrylate, 2-ethylhexyl methacrylate, and 2-hydroxyethyl methacrylate; acrylate esters such as ethyl acrylate, butyl acrylate, 2-ethylhexyl acrylate, and 2-hydroxyethyl acrylate; maleic acid esters such as dimethyl maleate and diethyl malate; fumaric acid esters such as dimehtyl fumarate and diethyl fumarate; and styrene, vinyltoluene, α-methylstyrene, vinyl chloride, vinyl acetate, butadiene, acrylamide, acrylonitrile, methacrylic acid, acrylic acid and maleic acid.

These vinyl polymerizable monomers B act as modifying components that impart desirable properties to the antifouling paint according to its specific use; these monomer also useful for the purpose of obtaining polymers that have higher molecular weights than the homopolymers of monomers A, A' and A". The amount of monomer B used is appropriately determined in consideration of the properties it imparts and the antifouling effect achieved by at least one of monomers A, A' and A". Generally, the proportion of monomer B is not more than 95 wt %, preferably not more than 90 wt %, of the total amounts of monomers A, A' and A" and monomer B. The reason for selecting this range is that if the proportion of monomers A, and A" in copolymer AB is at least 5 wt %, especially at least 10 wt %, the intended antifouling effect can be satisfactorily achieved.

Polymer A and copolymer AB may be formed by polymerizing at least one of monomers A, A' and A"

alone and in combination with monomer B, respectively, in the presence of a vinyl polymerization initiator in accordance with routine procedures. Methods of polymerization include solution polymerization, bulk polymerization, emulsion polymerization and suspension polymerization. Illustrative vinyl polymerization initiators are azo compounds such as azobisisobutyronitrile and triphenylmethylazobenzene, and peroxides such as benzoyl peroxide and di-tert-butyl peroxide. As already noted, it is important that the polymerization reaction be carried out with the water in the monomers and reaction solvent being eliminated as much as possible in order to prevent the hydrolysis of monomers A, A' and A" during polymerization.

The polymer A and copolymer AB to be prepared by the methods described above preferably have weight average molecular weights within the range of 1,000 to 1,500,000. If the molecular weight of the polymer A or copolymer AB is too low, it is difficult to form a rigid, uniform and durable film. If the molecular weight of polymer A or copolymer AB is too high, it makes the varnish highly viscous. Such a high viscosity varnish should be thinned with a solvent for formulating a paint. Therefore, the resin solids content of the paint is reduced and only a thin dry film can be formed by a single application. This is inconvenient in that several applications of paint are necessary to attain proper dry film thickness.

An antifoulant is also an essential component of the antifouling paint of the present invention. While a broad spectrum of known antifoulants may be employed, they are roughly divided into metal-containing organic compounds, metal-free organic compounds, and inorganic compounds.

Metal-containing organic compounds include organotin compounds, organocopper compounds, organonickel compounds, and organozinc compounds, as well as maneb, manzeb and propineb. Metal-free organic compounds include N-trihalomethylthiophthalimides, dithiodcarbamic acid compounds, N-arylmaleimides, 3-substituted-amino-1,3-thiazolidine-2,4-diones, and dithiocyano based compounds. Inorganic compounds include copper compounds such as cuprous oxide, copper powder, copper thiocyanate, copper carbonate, copper chloride and copper sulfate, and other compounds such as zinc sulfate, zinc oxide and nickel sulfate.

Illustrative organotin compounds in the group of metal-containing organic compounds include: triphenyltin halides such as triphenyltin chloride and triphenyltin fluoride; tricyclohexyltin halides such as tricyclohexyltin chloride and tricyclohexyltin fluoride; tributyltin halides such as tributyltin chloride and tributyltin fluoride; and triphenyltin hydroxide, tricyclohexyltin hydroxide, bis-(triphenyltin)-α,α'-dibromosuccinate, bis(tricyclohexyltin)-α,α'-dibromosuccinate, bis(tributyltin)-α,α'-dibromosuccinate, bis-(triphenyltin)oxide, bis-(tricyclohexyltin)oxide, bis-(tributyltin)oxide, triphenyltin acetate, tricyclohexyltin acetate, tributyltin acetate, triphenyltin monochloroacetate, triphenyltin versatic acid esters, triphenyltin dimethyldithiocarbamate, and triphenyltin nicotinic acid esters.

Illustrative organocopper compounds include oxine copper, copper nonylphenolsulfonate, copper bis(ethylenediamine)-bis(dodecylbenzene sulfonate), copper acetate, copper naphthenate, and copper bis(pentachlorophenolate). Illustrative organo-nickel compounds include nickel acetate and nickel dimethyldithiocarbamate. Illustrative organozinc compounds include zinc acetate, zinc carbazinate, and zinc dimethyldithiocarbamate.

In the metal-free organic compounds listed above, N-trihalomethylthiophthalimides include N-trichloromethylthiophthalimide and N-fluorodichloromethyl-thiophthalimide; dithiocarbamic acid compounds include bis(dimethylthiocarbamoyl)disulfide, ammonium N-methyl-dithiocarbamate, ammonium ethylene-bis(dithiocarbamate) and milneb; N-arylmaleimides include N-(2,4,6-trichlorophenyl)maleimide, N-4-tolylmaleimide, N-3-chlorophenyl-maleimide, N-(4-n-butylphenyl)maleimide, N-(anilinophenyl)maleimide and N-(2,3-xylyl)maleimide; 3-substituted-amino-1,3-thiazolidine-2,4-diones include 3-benzylideneamino-1,3-thiazolidine-2,4-dione, 3-[4-methyl-benzylideneamino)-1,3-thiazolidine-2,4-dione, 3-(2-hydroxybenzylideneamino)-1,3-thiazolidine-2,4-dione, 3-(2,4-dimethylaminobenzylideneamino)-1,3-thiazoline-2,4-dione, 3-(2,4-dichlorobenzylideneamino)- 1,3-thiazolidine-2,4-dione; and dithiocyano compounds include dithiocyanomethane, dithiocyanoethane, d 2,5-dithiocyanothiophene.

Other examples of metal-free organic compounds include 2-amino-3-chloro-1,4-naphthoquinone, 2,3-dichloro-1,4-naphthoquinone, and 5,10-dihydro-5,10-dioxanaphthao[2,3-b]1,4-dithiyne-2,3-dicarbonitrile.

In the present invention, one or more of the antifoulants listed above are selectively employed. The amount of these antifoulants used should be properly determined in consideration of the antifouling effect anticipated from the hydrolyzability of the film formed of polymer A and/or copolymer AB. Generally, the antifoulants are desirably employed in amounts of 0.1–65 wt % of the total of polymer A and/or copolymer AB and the antifoulant. if the proportion of the antifoulant is too small, the antifouling effect mentioned above is not attainable. If the proportion of the antifoulant is excessive, the antifouling film formed from the applied paint is likely to develop defects such as cracking and delamination and fails to produce effective fouling resistance.

As will be apparent form the foregoing description, the antifouling paint of the present invention contains as its essential components polymer A and/or copolymer AB and the antifoulant specified above. The antifouling paint of the present invention is typically used after being diluted with an organic solvent. Therefore, practical considerations indicate that it is preferred to prepare polymer A and/or copolymer AB by solution polymerization or bulk polymerization. In solution polymerization, the reaction solution obtained may be used either as such or after being diluted with a solvent. In bulk polymerization, the reaction product obtained may be used after being dissolved in a solvent.

Examples of the organic solvent that can be used to dilute the antifouling paint of the present invention include: aromatic hydrocarbons such as xylene and toluene; aliphatic hydrocarbons such as hexane and heptane; esters such as ethyl acetate and butyl acetate; alcohols such as isopropyl alcohol and butyl alcohol; ethers such as dioxane and diethyl ether; and ketones such as methyl ethyl ketone and methyl isobutyl ketone. These organic solvents may be used either alone or in admixture.

The organic solvents are preferably used in such amounts that the concentration of polymer A and/or copolymer AB in the solution generally ranges from 5 to 80 wt %, preferably from 30 to 70 wt %. The solution preferably has a viscosity of not higher than 150 poises at 25° C. in order to facilitate the film formation from the solution.

The antifouling paint of the present invention thus prepared may optionally contain colorants such as pigments (e.g., red oxide and titanium dioxide) and dyes. The paint may also contain conventional antisagging agents, antiflooding agents, antisettling agents, and antifoaming agents.

The surfaces of structures to be submerged in seawater are treated with the antifouling paint of the present invention to form an antifouling film. The procedure of such treatment is simple; for instance, a solution of the paint is applied to the surface of the structure of interest by an appropriate means and the solvent is removed by evaporation at ordinary temperature or under heating.

The polymer A and/or copolymer AB used in the present invention has the organosilyl or organosiloxane D group that derives from monomers A, A', and A" and because of these groups, the polymer A or copolymer AB is capable of forming a hydrolyzable paint film.

Vinyl polymerizable monomer B in copolymer AB acts as a modifying component that is effectively imparting an adequate degree of hydrolyzability to the surface of the film formed from copolymer AB, and in forming a polymer having a higher molecular weight than a homopolymer of monomer A, A', or A".

The antifoulant used in the present invention provides chemical prevention against the attachment of marine fouling organisms and offers improved and lasting fouling resistance by the hydrolyzability of the film formed from polymer A and/or copolymer AB, because it dissolves slowly into seawater while permitting the antifoulant to be released simultaneously.

As discussed above, in the antifouling paint of the present invention which employs polymer A and/or copolymer AB in combination with an antifoulant, polymer A and/or copolymer AB properly controls the antifoulant so that it will not dissolve in seawater either excessively or insufficiently and this will help provide a paint film that consistently displays long-lasting fouling resistance.

The polymer specified in the present invention for use in an antifouling paint is inert and forms a thermoplastic film that dries upon solvent evaporation and which is insoluble in seawater. Therefore, the antifouling paint of the present invention has the following advantages over the conventional antifouling paints.

First, it is stable and can be formulated in a paint without experiencing any risk of deterioration by reaction with antifoulants. The container of the paint does not need to be filled with an inert gas because it has an unlimited pot life.

Secondly, the paint dries quickly after application and yet will not blister or separate from the substrate because it will not experience any inadequate curing in the inner portion of the paint film and the drying speed is not affected by moisture or temperature.

Thirdly, the film formed from the antifouling paint of the present invention can be overcoated with a similar or dissimilar paint without sacrificing the strength of intercoat adhesion.

Fourthly, when the film formed from the paint of the present invention is placed in contact with seawater, it hydrolyzes slowly from the surface and the resulting dissolution of the resin is accompanied by simultaneous release of the antifoulant to the surface of the coating. This enables the coating to exhibit the desired antifouling performance over a prolonged period of time.

Because of these advantages, the paint film provided by the present invention exhibits excellent fouling resistance when applied to items that require protection against the attachment of marine fouling organisms, such as ship bottoms, structures in seawater such as fishing nets and cooling water pipes, or membranes used to prevent the spreading of sludge or slime occurring in under-sea civil engineering work. In this way, the antifouling paint of the present invention prevents substrates in seawater from being damaged by the attachment of fouling organisms.

EXAMPLE

The present invention is hereinafter described in greater detail with reference to the following examples of polymer preparation, working examples and comparative examples, wherein all parts are by weight basis. The data for viscosity were obtained by the measurement of bubble viscosities at 25° C., and the data for molecular weights are indicated in terms of weight average molecular weights as measured by GPC (gel permeation chromatography).

PREPARATION EXAMPLES 1 TO 5

Into a flask equipped with a stirrer was charged a cooking solvent a (for substance and amount, see Table 2-1 and 2-2), which was heated to a predetermined reaction temperature. A liquid mixture of monomer A and/or A', monomer B and a polymerization catalyst a (for substances and amounts, see Tables 2-1 and 2-2) was introduced dropwise into the flask with stirring over a period of 6 hours. After completion of the addition, the contents of the flask were held at the reaction temperature for a period of 30 minutes. Subsequently, a mixture of a cooking solvent b and a polymerization catalyst b (for substances and amounts, see Tables 2-1 and 2-2) was added dropwise over a period of 20 minutes, and the resulting mixture was held at the predetermined temperature for 5 hours with stirring so as to complete the polymerization reaction. Finally, a diluting solvent was added to dilute the reaction product. By these procedures, polymer solutions I–V were prepared.

PREPARATION EXAMPLES 6 AND 7

Into a heat- and pressure-resistant autoclave was charged monomer A and/or A', monomer B and a polymerization catalyst in accordance with the formulations shown in Tables 2-1 and 2-2. The autoclave was completely closed and the contents were heated to the reaction temperature under shaking. Thereafter, the shaking of the autoclave was continued at the same temperature for 8 hours until the polymerization reaction was completed. A diluting solvent was then added and shaking was continued for an additional 3 hours to obtain polymer solutions VI–VII.

PREPARATION EXAMPLES 8 TO 12

Into a flask equipped with a stirrer was charged a cooking solvent b (for substances and amounts, see Tables 2-3 and 2-4), which was heated to a predetermined reaction temperature. A liquid mixture of monomer A", monomer B and a polymerization catalyst (for substances and amounts, see Tables 2-3 and 2-4) was introduced dropwise into the flask with stirring over a period of 6 hours. After completion of the addition, the contents of the flask were held at the reaction temperatuare for a period of 30 minutes. Subsequently, a mixture of a cooking solvent b and a polymerization catalyst b (for substances and amount, see Tables 2-3 and 2-4) was added dropwise over a period of 20 minutes, and the resulting mixture was held at the reaction temperature for 5 hours with stirring so as to complete the polymerization reaction. Finally, a diluting solvent was added to dilute the reaction product. By these procedures, polymer solutions VIII XII were prepared.

Monomers A ($A_1$-$A_5$), A' ($A'_1$-$A'_4$) and A" ($A"_1$-$A"_5$) employed in Preparation Examples 1-12 were those represented by general formulas (a), (b) and (c), respectively, and X, Y, m ($\bar{m}$), n ($\bar{n}$), p ($\bar{p}$), $R_1$-$R_5$, $R'_1$-$R'_5$, and $R"_1$-$R"_5$ in the structures of these monomers are identified in the following Tables 1-1 and 1-2.

TABLE 1-1

| Monomer | X (or Y) | $\bar{m}$ (or $\bar{n}$) | $R_4$, $R_5$ (or $R_4'$, $R_5'$)[1] | $R_1$-$R_3$ (or $R_1'$-$R_3'$)[2] |
|---|---|---|---|---|
| Monomer A | | | | |
| $A_1$ | $CH_3$ | 20 | $CH_3$ (40) | $CH_3$ (3) |
| $A_2$ | H | 500 | $CH_3$ (800), $C_6H_5$ (200) $CH_3$ (900) $C_2H_5$ (100) $C_3H_7$ (100) $C_4H_9$ (100) | $C_6H_4CH_3$ (3) |
| $A_3$ | $CH_3$ | 900 | $C_5H_{11}$ (100) $C_6H_5$ (470) $OCH_3$ (5) $OC_2H_5$ (5) $OC_3H_7$ (5) $OC_4H_9$ (5) $OC_5H_{11}$ (5) $OC_4H_9$ (5) | $C_6H_5$ (3) |
| $A_4$ | $CH_3$ | 80 | $CH_3$ (160) | $OCH_3$ (3) |
| $A_5$ | $CH_3$ | 10 | $CH_3$ (20) | $OCH_3$ (3) |
| Monomer A' | | | | |
| $A_1'$ | $CH_3$ | 3,000 | $CH_3$ (6,000) | $CH_3$ (3) |
| $A_2'$ | $CH_3$ | 0 | — | $CH_3$ (3) |
| $A_3'$ | $CH_3$ | 50 | $CH_3$ (60), $C_2H_5$ (20), $C_6H_5$ (20) | $CH_3$ (3) |
| $A_4'$ | $CH_3$ | 3,000 | $CH_3$ (5,000), $C_6H_5$ (1,000) | $OC_6H_4CH_3$ (3) |

Notes:
[1] Numerals in parentheses denote the total numbers of $R_4$ and $R_5$ (or $R_4'$ and $R_5'$);
[2] Numerals in parentheses denote the total numbers of $R_1$-$R_3$ (or $R_1'$-$R_3'$).

TABLE 1-2

| | | | cis-trans geometrical isomerism | $Y_1$ Organic group of formula (1) | | | | $Y_2$ Organic group of formula (1) | | | | Other group |
|---|---|---|---|---|---|---|---|---|---|---|---|---|
| | $X_1$ | $X_2$ | | n' | $\bar{p}$ | $R_4"$, $R_5"$[1] | $R_1"$-$R_3"$[2] | n' | $\bar{p}$ | $R_4"$, $R_5"$[1] | $R_1"$-$R_3"$[2] | |
| Monomer A" | | | | | | | | | | | | |
| $A_1"$ | H | H | cis | 1 | 10 | $CH_3$ (20) | $CH_3$ (3) | — | — | — | — | $CH_3$ |
| $A_2"$ | H | H | cis | 0 | 0 | — | $C_5H_{11}$ (3) | — | — | — | — | $C_2H_5$ |
| $A_3"$ | H | H | cis | 1 | 7,000 | $CH_3$ (6,000) $C_6H_5$ (500) $OC_6H_5$ (20) $C_6H_4CH_3$ (480) $OSi(CH_3)_3$ (7,000) | $OC_6H_5$ (3) | — | — | — | — | $C_5H_5$ |
| $A_4"$ | $CH_3$ | $CH_3$ | trans | 0 | 5 | $CH_3$ (10) | $CH_3$ (3) | — | — | — | — | $CH_3$ |
| $A_5"$ | H | H | trans | 1 | 40 | $C_2H_5$ (60) $OSi(CH_3)_3$ (20) | $C_2H_5$ (3) | 1 | 2 | $OSi(CH_3)_3$ (4) | $CH_3$ (3) | — |

Notes:
[1] Numerals in parentheses denote the total number of $R_4'$ and $R_5"$;
[2] Numerals in parentheses denote the total number of $R_1"$-$R_3"$.

TABLE 2-1

| | Preparation Example | | | | | | |
|---|---|---|---|---|---|---|---|
| Composition (parts) | 1 | 2 | 3 | 4 | 5 | 6 | 7 |
| Cooking Solvent a | | | | | | | |
| Butyl acetate | — | 140 | — | — | — | — | — |
| Xylene | 50 | — | 20 | 40 | — | — | — |
| Ethylene glycol monoethyl ether | — | — | — | — | 15 | — | — |
| Monomer A | | | | | | | |
| $A_1$ | 60 | — | — | — | — | — | — |
| $A_2$ | — | 40 | — | — | — | — | — |
| $A_3$ | — | — | — | 20 | — | — | — |
| $A_4$ | — | — | — | — | 30 | — | — |
| $A_5$ | — | — | — | — | — | 90 | — |
| Monomer A' | | | | | | | |
| $A_1'$ | — | — | 15 | — | — | — | — |
| $A_2'$ | — | — | — | — | 20 | — | — |
| $A_3'$ | — | — | — | — | — | 10 | — |
| $A_4'$ | — | — | — | — | — | — | 30 |
| Monomer B | | | | | | | |
| Methyl methacrylate | 25 | 20 | — | 80 | — | — | 50 |
| n-Butyl methacrylate | — | 20 | 70 | — | — | — | 20 |
| Methacrylic acid | 5 | 10 | — | — | 5 | — | — |
| Vinyl acetate | — | — | — | — | — | — | — |
| Styrene | 10 | 10 | 15 | — | 45 | — | — |

TABLE 2-2

| | Preparation Example | | | | | | |
|---|---|---|---|---|---|---|---|
| Composition (parts) | 1 | 2 | 3 | 4 | 5 | 6 | 7 |
| Polymerization Catalyst a | | | | | | | |
| Azobisisobutyronitrile | 0.5 | — | — | 0.6 | — | — | — |
| Benzoyl peroxide | — | 0.4 | 0.7 | — | 0.8 | 0.5 | 0.5 |
| Cooking Solvent b | | | | | | | |
| Butyl acetate | — | 10 | — | — | — | — | — |

TABLE 2-2-continued

| Composition (parts) | Preparation Example | | | | | | |
|---|---|---|---|---|---|---|---|
| | 1 | 2 | 3 | 4 | 5 | 6 | 7 |
| Xylene | 10 | — | 10 | 15 | — | — | — |
| Ethylene glycol monoethyl ether | — | — | — | — | 100 | — | — |
| Polymerization Catalyst b | | | | | | | |
| Azobisisobutyronitrile | 0.2 | — | — | 0.2 | — | — | — |
| Benzoyl peroxide | — | 0.2 | 0.2 | — | 0.5 | — | — |
| Diluting Solvent | | | | | | | |
| Toleune | — | — | 40 | — | — | 100 | — |
| Xylene | 40 | — | 160 | 100 | 50 | 100 | 100 |
| Butyl acetate | — | 70 | — | 30 | — | 50 | — |
| Methyl isobutyl ketone | — | 20 | — | — | 50 | — | — |
| Methylethyl ketone | — | 20 | — | — | 100 | 50 | — |
| Reaction Temperature (°C.) | 95 | 120 | 140 | 110 | 145 | 110 | 130 |
| Appearance of Polymer Solution | clear | trans-lucent | trans-lucent | clear | clear | clear | trans-lucent |
| Viscosity of Polymer Solution | S | W | Y | X | G | E | Z |
| Molecular Weight of Polymer (× 10³) | 54 | 85 | 370 | 110 | 32 | 43 | 150 |
| Polymer Solution | I | II | III | IV | V | VI | VII |

TABLE 2-3

| Composition (parts) | Preparation Example | | | | |
|---|---|---|---|---|---|
| | 8 | 9 | 10 | 11 | 12 |
| Cooking Solvent a | | | | | |
| Butyl acetate | — | — | 30 | — | — |
| Xylene | 40 | 50 | — | 80 | 40 |
| Monomer A" | | | | | |
| $A_1''$ | 70 | — | — | 20 | — |
| $A_2''$ | — | 25 | — | — | — |
| $A_3''$ | — | — | 35 | — | — |
| $A_4''$ | — | — | — | 40 | — |
| $A_5''$ | — | — | — | — | 40 |
| Monomer B | | | | | |
| Methyl methacrylate | — | 10 | 40 | — | — |
| n-Butyl methacyrlate | — | 10 | — | — | 20 |
| Vinyl acetate | 30 | 40 | 15 | 40 | 40 |
| Styrene | 10 | 15 | 10 | — | — |
| Polymerization Catalyst a | | | | | |
| Azobisisobutyronitrile | 0.8 | — | — | — | 0.8 |
| Benzoyl peroxide | — | 0.5 | 0.5 | 0.8 | — |
| Cooking Solvent b | | | | | |
| Butyl acetate | — | — | — | — | — |
| Xylene | 10 | 10 | 30 | 20 | 10 |
| Polymerization Catalyst b | | | | | |
| Azobisisobutyronitrile | 0.2 | — | — | — | 0.3 |
| Benzoyl peroxide | — | 0.2 | 0.2 | 0.3 | — |

TABLE 2-4

| Composition (parts) | Preparation Example | | | | |
|---|---|---|---|---|---|
| | 8 | 9 | 10 | 11 | 12 |
| Diluting Solvent | | | | | |
| Toleune | — | — | 20 | — | — |
| Xylene | 50 | 100 | 100 | 20 | 30 |
| Butyl acetate | — | 20 | 80 | — | 20 |
| Methyl isobutyl ketone | — | — | — | — | — |
| Reaction Temperature (°C.) | 100 | 100 | 110 | 110 | 120 |
| Appearance of Polymer Solution | clear | clear | trans-lucent | clear | trans-lucent |
| Viscosity of Polymer Solution | Q | U | Z | F | X |
| Molecular Weight of Polymer (× 10³) | 34 | 66 | 120 | 38 | 85 |
| Polymer Solution | VIII | IX | X | XI | XII |

Examples 1 to 12

Twelve samples of antifouling paint were prepared by dispersing the polymer solutions I to XII with a homomixer (2,000 rpm) in accordance with the formulations shown in Table 3 (the figures in the tables are percents by weight).

Oil Blue ®-2N, Disparon ® 6900-20X, and Aerosil ® 300 are the trade names of Orient Chemical K. K., Kusumoto Kasei K. K., and Nippon Aerosil Co., Ltd., respectively.

Comparative Example 1

A sample of antifouling paint was prepared in accordance with the formulation shown in Table 3 replacing polymer solutoins I to XII with KE 45 TS (a trade name of Shin-Etsu Chemical Co., Ltd. for a 50 wt % toluene solution of a low-temperature curing oligomer-like silicone rubber).

Comparative Example 2

A sample of antifouling paint was prepared in accordance with the formulation shown in Table 3 by replacing polymer solutions I to XII with an organotin copolymer solution.

The organotin copolymer solution used in this comparative example was prepared by copolymerizing 40 parts of methyl methacrylate, 20 parts of octyl acrylate and 40 parts of tributyltin methacrylate; the copolymer had a weight average molecular weight of 90,000 and was dissolved in xylene to form a clear 50 wt % solution.

TABLE 3-1

| Composition (parts) | Preparation Example | | | | | | |
|---|---|---|---|---|---|---|---|
| | 1 | 2 | 3 | 4 | 5 | 6 | 7 |
| Polymer solution | | | | | | | |
| I | 40 | — | — | — | — | — | — |
| II | — | 40 | — | — | — | — | — |
| III | — | — | 45 | — | — | — | — |
| IV | — | — | — | 35 | — | — | — |
| V | — | — | — | — | 50 | — | — |
| VI | — | — | — | — | — | 35 | — |
| VII | — | — | — | — | — | — | 40 |
| KE 45 TS | — | — | — | — | — | — | — |
| Organotin copolymer solution | — | — | — | — | — | — | — |
| Antifoulant | | | | | | | |
| Cuprous oxide | 30 | — | — | — | 30 | 50 | 30 |
| Copper thiocyanate | — | 10 | — | — | — | — | — |
| Tetramethylthiuram sulfide | — | — | 5 | — | — | — | — |
| Ammonium ethylene bis(dithiocarbamate) | — | — | 15 | 5 | — | — | — |
| Triphenyltin hydroxide | 5 | 10 | 5 | 10 | 3 | — | — |
| Pigment | | | | | | | |
| Red oxide | — | 5 | 5 | 5 | — | — | — |
| Talc | — | — | — | — | — | — | — |
| Zinc oxide | — | — | 5 | 5 | 5 | 5 | — |
| Pigment | | | | | | | |

TABLE 3-1-continued

| Composition (parts) | Preparation Example | | | | | | |
|---|---|---|---|---|---|---|---|
| | 1 | 2 | 3 | 4 | 5 | 6 | 7 |
| TiO₂ | — | 5 | — | — | 3 | — | — |

TABLE 3-2

| Composition (parts) | Preparation Example | | | | | | |
|---|---|---|---|---|---|---|---|
| | 1 | 2 | 3 | 4 | 5 | 6 | 7 |
| Dye | | | | | | | |
| Oil Blue ®-2N | — | 1 | — | — | — | — | — |
| Antisagging Agnet | | | | | | | |
| Disparon ® 6900-20X | 3 | 2 | — | — | 3 | — | 5 |
| Aerosil ® 300 | — | — | 2 | — | — | 2 | — |
| Diluting Solvent | | | | | | | |
| Toluene | — | — | — | 10 | 6 | 8 | 15 |
| Xylene | 22 | 27 | 10 | 15 | — | — | — |
| Methyl isobutyl ketone | — | — | 8 | 10 | — | — | 10 |
| Isopropyl alcohol | — | — | — | 5 | — | — | — |
| Total | 100 | 100 | 100 | 100 | 100 | 100 | 100 |

TABLE 3-3

| Composition (parts) | Preparation Example | | | | | Comparative Example | |
|---|---|---|---|---|---|---|---|
| | 8 | 9 | 10 | 11 | 12 | 1 | 2 |
| Polymer solution | | | | | | | |
| VIII | 50 | — | — | — | — | — | — |
| IX | — | 45 | — | — | — | — | — |
| X | — | — | 35 | — | — | — | — |
| XI | — | — | — | 55 | — | — | — |
| XII | — | — | — | — | 40 | — | — |
| KE 45 TS | — | — | — | — | — | 50 | — |
| Organotin copolymer solution | — | — | — | — | — | — | 40 |
| Antifoulant | | | | | | | |
| Cuprous oxide | 20 | — | 0 | — | 40 | — | 40 |
| Copper thiocyanate | — | 10 | — | — | — | — | — |
| Tetramethylthiuram sulfide | — | — | 10 | — | — | — | — |
| Ammonium ethylene bis(dithiocarbamate) | — | — | — | 5 | — | — | — |
| Triphenyltin hydroxide | 15 | 10 | — | 10 | — | — | — |
| Pigment | | | | | | | |
| Red oxide | 3 | 5 | 5 | 5 | 10 | 10 | — |
| Talc | — | 5 | 5 | — | — | — | — |
| Zinc oxide | — | 10 | — | 10 | — | — | — |
| Pigment | | | | | | | |
| TiO₂ | — | — | 10 | — | 3 | — | — |

TABLE 3-4

| Composition (parts) | Preparation Example | | | | | Comparative Example | |
|---|---|---|---|---|---|---|---|
| | 8 | 9 | 10 | 11 | 12 | 1 | 2 |
| Dye | | | | | | | |
| Oil Blue ®-2N | — | 1 | — | — | — | — | — |
| Antisagging Agnet | | | | | | | |
| Disparon ® 6900-20X | 3 | 2 | — | — | 3 | — | 6 |
| Aerosil ® 300 | — | — | 2 | — | — | 3 | — |
| Diluting Solvent | | | | | | | |
| Toluene | — | — | — | — | — | 37 | — |
| Xylene | 9 | 10 | 28 | 5 | 4 | — | 14 |
| Methyl isobutyl ketone | — | 2 | — | 10 | — | — | — |
| Isopropyl alcohol | — | — | — | — | — | — | — |
| Total | 100 | 100 | 100 | 100 | 100 | 100 | 100 |

The performance of the samples of antifouling paints prepared in Examples 1 to 12 and Comparative Examples 1 and 2 was evaluated by physical performance test and antifouling perfomance test. Each of the tests and measurement thereof was conducted by the procedures shown below. The results are shown in Table 4.

Physical Performance Test

The storage stability, drying property and adhesion to a substrate were evaluated for each sample by the following methods.

(A) Storage Stability 200 ml of each sample was put into a 250-ml glass container which was closed with a cap. The container was stored in air codnitioned room (70° C. ×75% RH) for two weeks. The stability of the sample was determined in terms of increase in its viscosity and evaluated by the following criteria: ○, the increase in viscosity was less than 10% of the initial value; Δ, the increase was from 10% to less than 100% of the initial value; and x, the increase was at least 100% of the initial value.

(B) Drying Property

In accordance with the method specified in JIS K 5400.5.8, each of the samples was coated onto a glass plate in a wet film thickness of 100 μm with a film applicator. The drying property of the film was evaluated by the following criteria: ○, the tack-free drying time was less than 1 hour; the tack-free drying time was from 1 hour to less than 3 hours; and x, the tack-free drying time was at least 3 hours. Each of the test pieces had been desiccated in an air conditioned room (20° C.×75% RH). (C) Adhesion Test Evaluation of adhesion to substrate was conducted in accordance with the method of cross cut adhesion test specified in JIS K 5400.6.15; each of the samples was coated onto a polished steel panel (150×70×1 mm) in wet film thickness of 100 μm with a film applicator and dried for 1 week in air conditioned room (20° C.×75% RH); a 20 mm long crossed groove was cut through the film into the substarte with a cutter knife; the so prepared test piece was set in Erichsen film tester and a steel ball was pressed against the center of the back side of the test piece to produce vertical deformatoin of 10 mm. The adhesion of the film to the substrate was evaluated in terms of the length of peeling from the substrate as measured from the center of the cross cut. The criteria used were as follows: 0, 0 mm; Δ, less than 5 mm; and x, 5 mm or more.

Antifouling Performance Test

Sand blasted steel panels (100×200×1 mm) were coated with a coal tar-vinyl based anticorrosive paint. Both surfaces of each panel were sprayed with two layers of an antifouling paint under test so as to provide dry film thickness of 120 μm on each side.

The test panels prepared were immersed in seawater at Aioi Bay, Aioi, Hyogo, Japan (this bay is known to be a marine environment where the attachement and growth of fouling organisms is very active) for 24 months, during which period the increase in the area of the test panel that was covered by the marine fouling organisms (% attachment of fouling organisms) were measured at regular intervals of time.

TABLE 4

| | Example | | | | | | | | | | | | Comparative Example | |
|---|---|---|---|---|---|---|---|---|---|---|---|---|---|---|
| | 1 | 2 | 3 | 4 | 5 | 6 | 7 | 8 | 9 | 10 | 11 | 12 | 1 | 2 |
| Storage Stability | ○ | ○ | ○ | ○ | ○ | ○ | ○ | ○ | ○ | ○ | ○ | ○ | x | △ |
| Drying Property | ○ | ○ | ○ | ○ | ○ | ○ | ○ | ○ | ○ | ○ | ○ | ○ | x | ○ |
| Adhesion to sustrate | ○ | ○ | ○ | ○ | ○ | ○ | ○ | ○ | ○ | ○ | ○ | ○ | x | ○ |
| % Attachement of Fouling Organisms | | | | | | | | | | | | | | |
| 3 months | 0 | 0 | 0 | 0 | 0 | 0 | 0 | 0 | 0 | 0 | 0 | 0 | 30 | 0 |
| 6 months | 0 | 0 | 0 | 0 | 0 | 0 | 0 | 0 | 0 | 0 | 0 | 0 | 50 | 0 |
| 12 months | 0 | 0 | 0 | 0 | 0 | 0 | 0 | 0 | 0 | 0 | 0 | 0 | 90 | 10 |
| 18 months | 0 | 0 | 0 | 0 | 0 | 0 | 0 | 0 | 0 | 0 | 0 | 0 | 100 | 10 |
| 24 months | 0 | 0 | 0 | 0 | 0 | 0 | 0 | 0 | 0 | 0 | 0 | 0 | 100 | 50 |

The data in Table 4 show that the samples of antifouling paints prepared in Examples 1 to 12 were satisfactory in storage stability, drying property and adhesion to substrate. No attachment of fouling organisms was observed for a period of at least 24 months of immersion in seawater.

The sample prepared in Comparative Example 1 was a silicone rubber based paint and was unsatisfactory with respect to storage stability, drying property and adhesion to substrates.

The sample prepared in Comparative Example 2 was an antifouling paint based on an organotin copolymer. It was poor in storage stability and antifouling efffects.

While the invention has been described in detail and with reference to specific embodiments thereof, it will be apparent to one skilled in the art that various changes and modifications can be made therein without departing from the spirit and scope thereof.

What is claimed is:

1. An antifouling paint containing as its essential components an antifoulant and a polymer of at least one of monomers A and A' represented by the following general formulae (a) and (b), respectively, and/or a copolymer composed of at least 5 wt. % of at least one of the monomers A and A' and up to 95 wt. % of one or more vinyl polymerizable monomers B that are copolymerizable with said monomers A and A' and selected from the group consisting of a methacrylate ester, an acrylate ester, a maleic acid ester, a fumaric acid ester, styrene, vinyltoluene, α-methylstyrene, vinyl chloride, vinyl acetate, butadiene, acrylamide, acrylonitrile, methacrylic acid, acrylic acid and maleic acid:

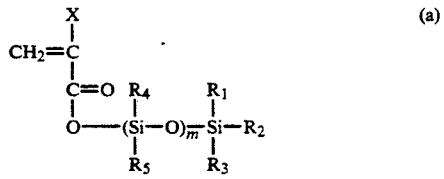

(a)

wherein X is a hydrogen atom or a methyl group; m is a real number of 1 or more; $R_1$-$R_5$ are each a group selected from the group consisting of an alkyl group of up to about 5 carbon atoms, an alkoxy group of up to about 5 carbon atoms, an unsubstituted phenyl group, a phenyl group substituted by halogen, an alkyl group, an alkoxyl group or an acyl group, an unsubstituted phenoxyl group and a phenoxyl group substituted by halogen, an alkyl group, an alkoxyl group or an acyl group; in which $R_1$-$R_5$ may be the same or different;

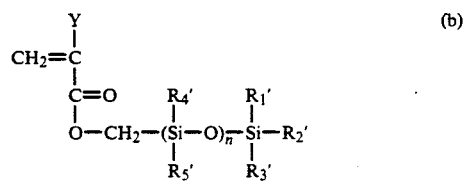

(b)

wherein Y is a hydrogen atom or a methyl group; n is 0 or more; $R'_1$-$R'_5$ each is a group selected from the group consisting of an alkyl group of up to about 5 carbon atoms, an alkoxyl group of up to about 5 carbon atoms, an unsubstituted phenyl group, a phenyl group substituted by halogen, an alkyl group, an alkoxyl group or an acryl group, an unsubstituted phenoxyl group and a phenoxyl group substituted by halogen, an alkyl group, an alkoxyl group or an acyl group, in which $R'_1$-$R'_5$ may be the same or different, and each of $R'_1$-$R'_5$ is other than the alkoxyl group when n is 0, said antifoulant being present in an amount of 0.1 to 65 wt. % of the total of said polymer and said antifoulant.

2. An antifouling paint containing as its essential components an antifoulant and a polymer of a monomer A" represented by the following general formula (c), and/or a copolymer composed of at least 5 wt. % of A" and up to 95 wt. % of one or more vinyl polymerizable monomers B that are copolymerizable with said monomer A" and selected from the group consisting of a methacrylate ester, an acrylate ester, a maleic acid ester, a fumaric acid ester, styrene, vinyltoleune, α-methylstyrene, vinyl chloride, vinyl acetate, butadiene, acrylamide, acrylonitrile, methacrylic acid, acrylic acid and maleic acid:

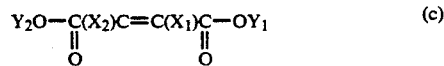

(c)

wherein $X_1$ and $X_2$ each is a hydrogen atom or a methyl group which may be either cis or trans form; one of $Y_1$ and $Y_2$ is an organic group represented by the following general formula (1):

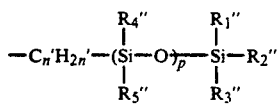

(1)

wherein n' is an integer of 0 or 1; p is 0 or more; $R''_1$ to $R''_5$, which may be the same or different, each is a group selected form the group consisting of an alkyl group, an alkoxyl group, an unsubstituted phenyl group, a phenyl group substituted by halogen, an alkyl group, an alkoxyl group or an acyl group, an unsubstituted phenoxyl group, a phenoxyl group substituted by halogen, an alkyl group, an alkoxyl group or an acyl group and an organosiloxane group; with the other being a hydrogen atom, an alkyl group, an unsubstituted phenyl group, a phenyl group substituted by halogen, an alkyl group, an alkoxyl group or an acyl group or an organic group represented by formula (1), said antifoulant being present in an amount of 0.1 to 65 wt. % of the total of said polymer and said antifoulant.

3. The antifouling paint of claim 1, wherein said antifouling paint contains a copolymer of at least one of monomers A and A' and one or more vinyl polymerizable monomers B.

4. The antifouling paint of claim 1, wherein said copolymer is composed of at least 10 wt. % of at least one of the monomers A and A' and up to 90 wt. % of said one or more vinyl polymerizable monomers B.

5. The antifouling paint of claim 2, wherein said copolymer is composed of at least 10 wt. % of monomer A" and up to 90 wt. % of said one or more vinyl polymerizable monomers B.

* * * * *